US009138007B2

(12) United States Patent
De Waele et al.

(10) Patent No.: US 9,138,007 B2
(45) Date of Patent: Sep. 22, 2015

(54) GLAZING AGENT FOR BAKED GOODS

(75) Inventors: Erwin Theofiel De Waele, Essen (BE); Joyce Allegonda Johanna Kox, Eersel (NL)

(73) Assignee: Dawn Foods, Inc., Jackson, MI (US)

( * ) Notice: Subject to any disclaimer, the term of this patent is extended or adjusted under 35 U.S.C. 154(b) by 86 days.

(21) Appl. No.: 13/817,472

(22) PCT Filed: Jul. 27, 2011

(86) PCT No.: PCT/NL2011/050543
§ 371 (c)(1),
(2), (4) Date: May 9, 2013

(87) PCT Pub. No.: WO2012/015303
PCT Pub. Date: Feb. 2, 2012

(65) Prior Publication Data
US 2013/0287912 A1 Oct. 31, 2013

(30) Foreign Application Priority Data
Jul. 28, 2010 (EP) ..................................... 10171053

(51) Int. Cl.
*A21D 13/00* (2006.01)
*A23J 3/14* (2006.01)
*A21D 15/02* (2006.01)
*A23J 3/16* (2006.01)
*A23J 3/18* (2006.01)
*A23L 1/00* (2006.01)

(52) U.S. Cl.
CPC ........ *A21D 13/0016* (2013.01); *A21D 13/0003* (2013.01); *A21D 13/0006* (2013.01); *A21D 13/0009* (2013.01); *A21D 15/02* (2013.01); *A23J 3/14* (2013.01); *A23J 3/16* (2013.01); *A23J 3/18* (2013.01); *A23L 1/005* (2013.01); *A23L 1/0047* (2013.01); *A23V 2002/00* (2013.01)

(58) Field of Classification Search
CPC ..................... A23V 2002/00; A23V 2250/548; A23G 3/346; A23L 1/0052; A23L 1/0047; A23L 1/3055; A21D 13/0016; A21D 13/0003; A21D 13/0009; A21D 13/0006; A21D 13/0067; A23J 3/14
USPC .................................. 426/302, 656, 519, 565
See application file for complete search history.

(56) References Cited

U.S. PATENT DOCUMENTS 5,529,800 A * 6/1996 Bourns et al. .................. 426/572
2005/0191390 A1 9/2005 Krochta

FOREIGN PATENT DOCUMENTS

| EP | 0 058 277 A1 | 8/1982 |
|---|---|---|
| FR | 2 826 238 A1 | 12/2002 |
| WO | 9400996 A1 | 1/1994 |
| WO | 9842214 A2 | 10/1998 |
| WO | 02065849 A1 | 8/2002 |

OTHER PUBLICATIONS

Agboola, S. et al. 2005. J. cereal Sci. 41: 283-290.*
Shand P.J., Pietrasik H.YA.Z., Wanasundra P.K.J.P.D.: "Physicochemical and textural properties of heat-induced pea protein isolate gels." Food Chemistry, vol. 102 2007, pp. 1119-1130, XP002616138, retrieved from the internet: URL:http://www.sciencedirect.com/science?_ob=MImg&imagekey=B6T6R-4MOBHRV-5-B&_cdi=5037&_user=987766&_pii=S0308814606005401&_origin=search&_coverDate=12%2F31%2F2007&_sk=998979995&view=c&wchp=dGLbVzz-.
Bacon J.R., Noel T.R., Wright D.J.: "Studies on the thermal behaviour of pea (*Pisum sativum*) vicilin", J Sci Food Agric, vol. 49 1989, pp. 335-345, XP002616139, retrieved from the internet: URL:http://onlinelibrary.wiley.com/doi/10.1002/jsfa.2740490310/pdf [retrieved on Jan. 7, 2011] abstract p. 335-337.
Zheng B.-A., Matsumura Y., Mori T.: "Relationship between the thermal denaturation and gelling properties of legumin from broad beans", BIOSCI.BIOTECH.BIOCHEM., vol. 57 1993, pp. 1087-1090, XP002616140, retrieved from the internet: URL:http://www.journalarchive.jst.go.jp/jnlpdf.php?cdjournal=bbb1992&cdvol=57&noissue=7&startpage=1087&lang=en&from=jnlabstract [retrieved on Jan. 7, 2011] the whole document.
Choi W.S., Han J.H.: "Film-forming mechanism and heat denaturation effects on the physical and chemical properties of pea-protein-isolate edible films", Journal of Food Science, vol. 67 2002, pp. 1399-1406, XP02616141, retrieved from the Internet: URL:http://onlinelibrary.wiley.com/doi/10.1111/j.1365-2621.tb10297.x/pdf [retrieved on Jan. 7, 2011] the whole document.

* cited by examiner

*Primary Examiner* — Hamid R Badr
(74) *Attorney, Agent, or Firm* — Young Basile Hanlon & MacFarlane P.C.

(57) ABSTRACT

The present invention is directed to a method to produce a glazing agent comprising the steps: disperse vegetable protein in water to obtain a vegetable protein solution of from 5 to 15 wt % of vegetable protein, optionally homogenize the vegetable protein solution, heat vegetable protein solution at a temperature of from 100 to 155° C. for 0.1 seconds to 60 minutes. The present invention is also directed to a glazing agent obtainable by the method and to a glazing agent comprising a solution of 5 to 15 wt % of vegetable protein with a viscosity of 35 mPa·s or lower. Furthermore the present invention is directed to the use of a vegetable protein solution as a glazing agent for baked goods.

24 Claims, No Drawings

GLAZING AGENT FOR BAKED GOODS

The present invention relates to a method to produce a glazing agent comprising vegetable protein and a glazing agent obtainable there from.

BACKGROUND

It is known that gloss can be imparted to the surface of baked goods by brushing the baked goods, at the place where this gloss is desired, with lightly beaten egg before baking. Indeed, such a glazing agent yields a reasonably well adhering, shiny coating, but it has many disadvantages. When using pasteurised egg, this product needs a cold supply chain and storage below 5° C. and has a short shelf life of only 4 weeks. Furthermore, even after pasteurization, it has a high microbial load, and egg needs to be declared as an allergen on the label of the final product. The price of eggs is high and fluctuates a lot, and there are people that do not want to consume eggs, such as vegans. On industrial scale the, egg wash is often sprayed on the baked goods; however, the spray nozzles are often clogged due to the egg protein. Cleaning of the nozzles and the nearby equipment and facilities such as conveyor belts is not easy as the egg wash sticks, especially when using hot water. Also the formation of off flavors is a well-known drawback from the use of egg wash in an industrial environment.

Glazing agent alternatives without egg are known. There are two main groups of glazing agent without egg: protein and/or starch based powders and ready-to-use (RTU) liquids that are mainly based on oil-in-water (O/W) emulsions. Powders have the disadvantage that they need rehydration in order to be used, this requires additional handling, specific equipment and know-how. In addition, the rehydration is done in open mixing vessels, which favours dust formation and impedes clean and hygienic working conditions. Moreover, uniform mixing requires time and attention of production staff, and after dispersion, a swell time of at least 20 minutes is usually required. As there is risk on sedimentation/precipitation or lump formation of poorly dispersed powder particles—which can clog the spray nozzles—continuous stirring is needed. Mixing equipment also needs to be thoroughly cleaned after each use.

Most RTU glazing agents are vegetable oil based O/W emulsions and contain emulsifiers like monoglycerides, diglycerides and/or lecithin as well as modified starches. These additives all need to be declared on the label as E-numbers. Most RTU glazing agents also contain milk proteins. For people that are either allergic to milk protein or people that do not want to consume dairy products, such an alternative glazing agent is not acceptable.

Recently pea protein isolate has been used as a glazing agent on biscuits. The pea protein is dispersed in water, homogenized and the resulting solution may be used as a glazing agent on baked goods.

There is however still a need for a glazing agent that does not have the drawbacks mentioned above, is easily applicable and has excellent gloss properties, under many circumstances, such as application before (egg wash) and after baking (bun shine) and even before freezing (such as on frozen bake-off pastry).

Therefore an object of the present invention is to provide a glazing agent that has good gloss properties; even on frozen bake-off pastry and that may be applied before and after baking. Another object of the present invention is to provide a glazing agent that does not contain allergens, and does not need addition of emulsifiers, and/or fat, and/or dairy components. Furthermore an object of the invention is to provide a glazing agent that is ready-to-use (RTU) and easily applicable on industrial scale, such as via spraying. Yet another object of the invention is to provide a glazing agent that has an ambient "closed shelf life" such that a cold supply chain is not required. Even another object of the invention is to provide a glazing agent that allows easy cleaning of e.g. spraying equipment and baking trays.

It has surprisingly been found that when a vegetable protein solution is heated above 100° C., excellent gloss properties may be obtained, which are comparable or sometimes even better than the conventional egg wash.

DETAILED DESCRIPTION

Glazing agent for baked goods may be applied before or after baking on baked goods such as pastries, breads, buns or cookies.

The requirements for a good glazing agent are manifold. On the one hand, good optical properties should be imparted to the baked goods, owing to the glazing agent being present in a smooth, shiny, homogeneous layer on the baked goods. On the other hand the agent must be readily applicable by spraying and therefore must have a low viscosity. It has appeared from experiments that the lower the viscosity of a glazing agent, the better and easier it can be sprayed. RTU egg wash alternatives that have higher viscosities are more difficult to spray. In principle, the viscosity may be reduced by the addition of water, the diluted egg wash or RTU egg wash alternatives will often tend to form islands or droplets on the goods to be baked, so that, after baking, no firm, shiny, homogeneous film is obtained. Moreover, the addition of water will reduce their solids content so that too much glazing agent has to be applied in order to obtain sufficient gloss on the baked goods after baking.

If the viscosity is too high, the glazing agent can not be applied readily to the goods to be baked and, moreover, the thickness of the film can not be controlled well, and the optical properties of the films are clearly worse (e.g. less or uneven gloss). Besides that, the danger of skin formation exists, i.e. that the glaze layer becomes detached locally or completely from the baked goods. Thus a good glazing agent is easily sprayable, is compatible with different spraying equipment, gives an even coverage without any islands, and gives a nice thin and non-sticky coating which lasts during the shelf life of the baked product.

When the glazing agent, upon heating on the surface of the baked goods, becomes brown too quickly, indeed a smooth and shiny layer is obtained in an early stage of the baking process, but the baked goods have not yet been sufficiently well baked and the further heating necessary for this then leads to deterioration of the quality of the glaze coating. Therefore a good balance should be found between the browning speed of the glazing agent on the one hand and, on the other hand, the baking speed of the goods to be baked.

In a first aspect the invention relates to a method to produce a glazing agent comprising the steps:
(a) Disperse vegetable protein in water to obtain a vegetable protein solution of from 5 to 15 wt % of vegetable protein
(b) Optionally homogenise the vegetable protein solution
(c) Heat the vegetable protein solution at a temperature of from 100 to 155° C. for 0.1 seconds to 60 minutes,
wherein the vegetable protein is selected from the group consisting of pulse, soy and wheat gluten and combinations thereof, and wherein the vegetable protein solution has a pH of at least 7.0 before heating.

The applicant has surprisingly found that a vegetable protein solution can be heated above 100° C. This is unexpected as it is known that most protein do not stand heat very well and denaturate and/or aggregate when heated thereby becoming insoluble in water. In general vegetable protein, and especially pea protein, consist of mainly water soluble proteins, including globular proteins (55-65%) and albumin fractions (18-25%) (Guéguen J., Cerletti P., Legume Seeds Proteins. In "New and Developing Sources of Food Proteins". Ed. B.J.F. Hudson. Chapman & Hall, London, 1994, 6, 145). Heat induced gelation is typical of globular proteins and proceeds through a series of transitions: (i) denaturation (unfolding) of native proteins [exposing reactive sites]; (ii) aggregation of unfolded molecules; (iii) strand formation from aggregates, and (iv) association of strands into a network (Aguilera, J. M. 1995. Gelation of whey proteins. Food Technol., 49 (10): 83-86, 88-89).

Even more surprisingly, it was found that not only the vegetable protein solution may be heated above 100° C., the gloss finish properties of the glazing agent was significantly improved when compared to vegetable protein solution that was not subjected to temperatures above 100° C., but only to 85° C. Especially when used on frozen bake-off goods, the glazing agent according to present invention shows excellent and long lasting gloss properties, while glazing agent of vegetable protein solution subjected to only 85° C. gave a less glossy finish, which rapidly fades away upon frozen storage.

It was further found that the glazing agent of the present invention is easily cleaned.

The glazing agent of the present invention dries into a thin brittle sheet, such that baking trays and conveyor systems are easy to clean, simply by brushing off after baking, while most O/W emulsion based alternatives leave a fatty and difficult-to-clean deposit on the baking trays and conveyor belts. Unlike traditional egg wash, the glazing agent of the present invention will not precipitate in hot water. Hence, spraying equipment is easy to clean with hot water subsequent to the use of the glazing agent of the present invention.

In addition, the viscosity of the glazing agent of the present invention is lower than known RTU glazing agent and conventional egg wash. For example, at a shear rate of $100$ $s^{-1}$, the viscosity of conventional egg wash is 25 mPa·s. At the same shear rate, a 9% pea protein solution reveals a viscosity of 40 mPa·s when heated to 85° C. It is to be understood that the viscosity of a solution may be adjusted by adding viscosifyers such as sugar or starches. However, the viscosity of the vegetable protein solution as defined above is the viscosity of the vegetable protein solution without any additives, at a shear rate of $100$ $s^{-1}$, at room temperature.

The vegetable proteins that show the beneficial effect upon heating above 100° C. are selected from the group consisting of soy, pulse and wheat gluten and combinations thereof. Any combination of pulse protein, soy protein and/or wheat gluten is envisioned in the present invention. For example, the vegetable protein solution of the present invention may comprise pea protein in combination with soy protein. Also combinations of different pulse proteins are envisioned, such as combinations of lupin protein with lentil protein. Combinations of 2, 3, 4, 5, 6, 7 or even more different vegetable proteins are expressly within the scope of the present invention.

Soy protein is protein isolated from the soybean. Soybean or soya bean (*Glycine max*) is a species of legume native to East Asia, widely grown for its edible bean which has numerous uses. The plant is classed as an oilseed rather than a pulse. Soy protein is made from dehulled, defatted soybean meal. Dehulled and defatted soybeans are processed into three kinds of high protein commercial products: soy flour, concentrates, and isolates.

Wheat gluten is a protein composite found in foods processed from wheat. It gives elasticity to dough, helping it rise and keep its shape, and often gives the final product a chewy texture.

Pulses are annual leguminous crops yielding from one to twelve seeds of variable size, shape, and color within a pod. For the purpose of this invention, pulse comprise, wild bean, broad bean, chickpea, pea, cowpea, pigeon pea, lentil, earth pea, vetch, lupin, lablab, jack bean, winged bean, velvet bean, yam bean.

Wild bean (*Phaseolus* spp.) such as Kidney bean, haricot bean, pinto bean, navy bean (*Phaseolus vulgaris*), Lima bean, butter bean (*Phaseolus lunatus*), Azuki bean, adzuki bean (*Vigna angularis*), Mung bean, golden gram, green gram (*Vigna radiata*), Black gram, urad (*Vigna mungo*), Scarlet runner bean (*Phaseolus coccineus*), Ricebean (*Vigna umbellata*), Moth bean (*Vigna acontifolia*), Tepary bean (*Phaseolus acutifolius*), Broad beans (*Vicia faba*), such as Horse bean (*Vicia faba equina*), Broad bean (*Vicia faba*), Field bean (*Vicia faba*);

Peas (*Pisum* spp.), such as Garden pea (*Pisum sativum* var. *sativum*), Protein pea (*Pisum sativum* var. *arvense*), Chickpea (*Cicer arietinum*)

Cowpea, black-eyed pea, blackeye bean (*Vigna unguiculata*)

Pigeon pea, or Arhar/Toor, or cajan pea, or Congo bean (*Cajanus cajan*)

Lentil (*Lens culinaris*)

Bambara groundnut, earth pea (*Vigna subterranea*)

Vetch, common vetch (*Vicia sativa*)

Lupins (*Lupinus* spp.)

*Lupinus*, commonly known as Lupins or lupines (North America), is a genus in the legume family (Fabaceae). The genus comprises about 280 species. http://en.wikipedia.org/wiki/Lupins-cite_note-class-0#cite_note-class-0 The species are mostly herbaceous perennial plants 0.3-1.5 m (0.98-4.9 ft) tall, but some are annual plants and a few are shrubs up to 3 m (10 ft) tall with one species (*Lupinus jaimehintoniana* from the Mexican state of Oaxaca) a tree up to 8 m (26 ft) high with a trunk 20 cm (7.9 in) in diameter. The fruit is a pod containing several seeds.

Lablab, or hyacinth bean (*Lablab purpureus*)

Jack bean (*Canavalia ensiformis*), or sword bean (*Canavalia gladiata*)

Winged bean (*Psophocarpus teragonolobus*)

Velvet bean, cowitch (*Mucuna pruriens* var. *utilis*)

Yam bean (*Pachyrrizus erosus*).

Preferred vegetable protein are pulses. Preferred vegetable protein is protein from wild bean, broad bean, chickpea, pea, cowpea, pigeon pea, lentil, earth pea, vetch, and/or lupin. More preferred pulse protein is protein from chickpea, pea, lentil, wild bean and/or lupin. Even more preferred vegetable protein is protein from pea and/or lupin, and the most preferred vegetable protein is pea protein. A glazing agent of the present invention requires only the presence of vegetable protein in order to be suitable for use as a glazing agent. When the glazing agent of the present invention comprises pea protein only, it contains no allergens. In addition, no chemically synthesized emulsifiers are needed; it may therefore be 100% vegan and have a clean label.

Therefore an aspect of the present invention is related to a glazing agent comprising a solution of 5 to 15 wt % vegetable protein wherein the viscosity of the vegetable protein solution without any additives is lower than 35 mPa·s at a shear rate of 100 s$^{-1}$ at room temperature and wherein the vegetable protein is selected from the group of pulse, soy and wheat gluten, and wherein the pH of the vegetable protein solution is from 7.0 to 9.0. The glazing agent of the present invention preferably has a viscosity lower than 35 mPa·s, more preferably from 30 to 10 mPa·s, and even more preferably from 25 to 15 mPa·s at a shear rate of 100 s$^{-1}$, at room temperature.

The lower viscosity of the glazing agent of the present invention allows increasing the flow rate at the spraying machines, enabling more baked goods to be sprayed at a time, and to eliminate heavy edges. Moreover, it requires a lower pressure to maintain finer drop sizes, an adequate spray angle and even coverage. Unlike egg wash and most RTU egg wash alternatives, the low viscosity of the glazing agent of the present invention enables the use of hydraulic atomizing nozzles, making air atomisation superfluous. This secures an optimised spray pattern with finest drop size and even coverage, yet eliminates risks on misting or overspray.

The glazing agent of the present invention is also stable and will not form lumps so that spraying devices do not become clogged, which is often the case with powder based glazing agents.

Furthermore, thanks to its tolerance against high temperatures, the glazing agent of the present invention is able to withstand a sterilization treatment. Such treatment allows a closed shelf life at room temperature for various months. Unlike pasteurized egg, this enables a simple supply chain without need for refrigeration. In addition, the closed shelf life is prolonged compared to pasteurized eggs.

Optionally the vegetable protein solution is homogenised. It depends on the source of vegetable protein used whether homogenisation is needed or not. It was seen that heating improves the solubility of the vegetable proteins so that often homogenisation is not needed.

The vegetable protein solution should be heated above 100° C. Suitable temperatures range from 110 to 145° C., more suitable from, 120 to 135° C. and most suitable from 125 to 130° C. The heating time may range from 0.1 seconds to 60 minutes. Suitable heat times range from 30 seconds to 15 minutes, preferably for 1 to 10, more preferably from 3 to 7 minutes. It is to be understood that a skilled person may optimise the heating conditions. Higher heating temperatures require less heating time, and lower heating temperatures require longer heating times, which a skilled person will know. The heating is done preferably in such a way that sufficient energy is provided to the vegetable protein to be fully solubilised but not so much that the vegetable proteins starts degrading and/or precipitating. It was found that the colour of the vegetable protein solution, especially pea protein solution, changes from golden yellow/ochrish to greyish when heated much, either at a high temperature or for a long time or both. The greyish vegetable protein solution still has the advantageous properties and is suitable to be used as glazing agent; however, if the greyish vegetable protein solution is continued to be heated, the solution will start to deteriorate and will lose its gloss properties. Thus, the colour of the vegetable protein, especially pea protein, solution changing from ochre to grey is a good visual cue for the heating conditions. A skilled person will be able to adjust and optimise the heating conditions based on the information above and his knowledge.

Suitable heating conditions are, for example 5 to 15 minutes at 121° C., 2 to 4 minutes at 128° C., 30 to 90 seconds at 135° C., or 2 to 10 seconds at 145° C. For example a *Botulinum* cook prescribes a "minimum heat impact" to secure food safety of sterilised low acid products upon various months of ambient shelf life. This means that the heat treatment must always result in minimum a 12D reduction of *Clostridium botulinum*, where D stands for Decimal Reduction Time (time required at a certain temperature to kill 90% of a specific micro-organism). For *botulinum* D at 121° C. is 15 sec, thus 12D is then 12*15=180 sec or 3 min.

It should be noted that vegetable protein is in the form of a solution and not as a slurry or a gel. To be able to be used as glazing agent the vegetable protein should be in a solution and not in a slurry or gel.

Preferably the vegetable protein solution is brought to a pH of at least 6.0 before heating. More preferably the vegetable protein solution is brought to a pH of at least 7.0 and even more preferably to at least 7.5. Preferably the pH is below 10, more preferably below 9.

The vegetable protein solution comprises about 5 to 15 wt % of vegetable protein. Suitably the vegetable protein solution comprises from 7 to 11 wt % vegetable protein, more suitably from 8 to 10 wt %. Vegetable proteins are suitably used in the form of vegetable protein isolates or concentrates, but may also be in the form of a flour or meal. In a preferred embodiment the vegetable protein is in the form of a vegetable protein isolate or vegetable protein concentrate, most preferably as a vegetable protein isolate. Vegetable protein isolates may be obtained from plants using a gentle physical process that preferably does not involve chemical solvents to avoid denaturation of the vegetable proteins. Vegetable proteins may be consumed by people that are vegan or vegetarian and also by people that are allergic to milk protein. In addition, vegetable proteins and especially pea protein have a high digestibility (98%) which is as high as milk protein. Especially pea protein have the advantage that they have a very low allergenic potential. Vegetable protein isolates—comprising proteins in their native state—are commercially available. Suitably, the vegetable protein is in its native state.

Another aspect of the present invention is directed to a glazing agent obtainable by the method of the present invention. As indicated above and shown below in the examples, the heating of the vegetable proteins to a temperature above 100° C. gives the vegetable protein solution different shine properties compared to vegetable protein solutions that have been subjected to 85° C.

In a preferred embodiment, the glazing agent of the present invention comprises a humectant. It was found that by adding a humectant to the vegetable protein solution even better shine properties were obtained, especially on frozen pastries. A humectant is a hygroscopic substance. It is often a molecule with several hydrophilic groups, most often hydroxyl groups. Examples of humectants include glycerol, propylene glycol (E 1520) and glyceryl triacetate (E1518). Others can be sugar polyols like sorbitol (E420), xylitol and maltitol (E965), polymeric polyols like polydextrose (E1200), or natural extracts like quillaia (E999), lactic acid or urea. Preferably the humectant is edible. Preferred humectants are selected from the group comprising glycerol, simple sugars such as sucrose, glucose and fructose, polyols such as sorbitol and maltitol, or other low molecular carbohydrates like (malto)dextrines, glucose syrups, fructo-oligosaccharides or polydextrose. The humectant may be present in amounts from 0.1 to 20 wt %, more preferably, from 1 to 15 wt % even more preferably from 3 to 10 wt % and most preferably from 5 to 8 wt %.

In another preferred embodiment, the glazing agent according to present invention has a pH is from 7.0 to 9.0, more preferably from 7.5 to 8.5, and most preferably from 7.8 to 8.2.

According to the present invention, when ranges are indicated e.g from 7 to 9, the values 7 and 9 are included.

The glazing agent of the present invention may also comprise sugar. In the present invention, sugar refers to mono- and/or disaccharides. Examples of monosaccharides include glucose, fructose, galactose, and xylose. Examples of disaccharides include sucrose, also known as saccharose, table sugar, cane sugar or beet sugar, lactulose, lactose, maltose, trehalose, and cellobiose. According to the present invention, sugar may be added in the form of table sugar, corn syrup, glucose syrup, fructose syrup. Suitably the sugar is added in an amount of from 0.1 wt % to 20 wt %, more suitably from 0.3 to 15 wt %, even more suitably from 0.5 to 10 wt %, and most suitably from 1 to 7 wt %. Adding sugar to the vegetable protein solution has the advantage that a sweet taste is added and that a brown colour appears after baking due to the Maillard reactions with the proteins.

Optionally other ingredients may be added to the glazing agent. For example rice protein may be added in an amount between 1 wt % and 0.001 wt %, preferably in an amount of between 0.8 wt % and 0.005 wt %, more preferably between 0.5 wt % and 0.01 wt %, more preferably between 0.3 wt % and 0.05 wt %, more preferably between 0.2 wt % and 0.1 wt %. Oil may be added to the glazing agent of the present invention, preferably in an amount of less than 4 wt %, preferably in an amount of less than 2 wt %, more preferably in an amount of less than 1 wt % and most preferably in an amount of less than 0.5 wt %. Suitably the glazing agent of the present invention comprises no oil. Preferably the oil is a liquid oil, and preferably the oil is vegetable, suitably with a neutral taste. In addition, hydrocolloids, starches and/or flours (e.g. rice flour) may be added to glazing agent of the present invention, to adjust the rheological properties of the glazing agent, especially to reduce drip off of the glazing agent from the baked good immediately after spraying. A skilled person may thus vary the rheological properties of the glazing agent of the present invention to his needs by adding e.g. rice flour. Suitable amount of hydrocolloids, starches or flours include from 0.05 to 2 wt %, more suitable from 0.1 to 1 wt % and most suitable from 0.3 to 0.8 wt %.

Suitably the glazing agent of the present invention is used to impart a shine or gloss on baked goods. Preferably, the glazing agent or vegetable protein solution of the present invention is applied before baking or after baking on baked goods selected from the group consisting of puff pastry, Danish pastry, croissants, viennoiserie, breads, bread rolls, buns, brioches, donuts, shortcrust, cookies, biscuits, bagels, pretzels, cakes, muffins, scones, tarts, pies, crumbles, strudels, as well as on cereals and bars (baked or non baked). In a preferred embodiment, the glazing agent or vegetable protein solution of the present invention is sprayed on the baked goods. Suitably, the glazing agent or vegetable protein solution of the present invention is applied on food products that are frozen, defrosted and/or will be frozen after the glazing agent or vegetable protein solution of the present invention is applied. It was surprisingly found by the present inventors that the glazing agent or vegetable protein solution of the present invention still imparts a good gloss when applied to food products that are frozen, defrosted or to be frozen. Preferred food products are selected from the group consisting of puff pastry, Danish pastry, croissants, viennoiserie, breads, bread rolls, buns, brioches, donuts, shortcrust, cookies, biscuits, bagels, pretzels, cakes, muffins, scones, tarts, pies, crumbles, strudels, as well as on cereals and bars (baked or non baked). More preferably, the food products are selected from the group consisting of puff pastry, Danish pastry, croissants, viennoiserie, breads, bread rolls, buns, brioches, donuts, shortcrust, cookies, biscuits, bagels, pretzels, cakes, muffins, scones, tarts, pies, crumbles, and strudels. In a preferred embodiment, the glazing agent or vegetable protein solution can be applied via spraying (e.g. by means of nozzles or disks), brushing or rolling.

EXPERIMENTAL

Test Setup

Following examples illustrates that sterilisation of a vegetable protein solution reveals a glazing agent with more persisting gloss when added on frozen bake off pastries compared to a heated yet non-sterilised vegetable protein solution. Besides, sterilization will also attribute lower viscosities and thus better spraying properties to the glazing agent.

Example 1

| ingredient | | 121° C. treatment | 85° C. treatment |
|---|---|---|---|
| Pea protein | Nutralys F85M (ex Roquette) | 9.4 | 9.4 |
| Rice flour | Remyflo R240 ED-T (ex. Beneo Remy) | 0.3 | 0.3 |
| Dried glucose syrup | Glucidex 21 (ex Roquette) | 0.3 | 0.3 |
| water | tap | 90 | 90 |
| NaOH | 33% solution | To pH 8.2 | |
| Total | | 100 | 100 |

Method of Preparation

"121° C. Treatment" (Sterilization)

Mix the powders and add to cold tap water while stirring.

Adjust the pH to 8.2 with NaOH

Put the product in sterilizable glass bottles

Sterilize the product using an autoclave (15 min.; 121° C.)

Cool down the bottles in ice water quickly after sterilization

Apply glazing agent on proofed croissants using a spray bottle.

"85° C. Treatment"

Mix the powders and add to heated water at a temperature of about 95° C. Immediately after addition of the powder mix, temperature of the obtained solution drops to about 85° C.

Let the solution cool down to ambient temperature.

Apply glazing agent on proofed croissants using a spray bottle.

Glazing, Freezing and Baking of Croissants

Divide the freshly sprayed croissants over 3 trays and put these without covering into a freezer (−20° C.).

a first tray is taken out of the freezer after 1 day. Part of the croissants are immediately baked (still frozen), another part is thawed for 1 hour at room temperature before baking Croissants are baked at 180/210° C. during approx 17 minutes Gloss is visually evaluated using a hedonic scale ranging from 0 (not shiny) to 3 (very shiny)

the other 2 trays are prepared and evaluated in a similar way, respectively after 2 and 3 days storage in the freezer.

Results

|  | 121° C. treatment | 85° C. treatment |
| --- | --- | --- |
| Shine on croissant after | | |
| 1 day at −20° C.; thawed before baking | 3 | 2 |
| 1 day at −20° C.; not thawed before baking | 3 | 1 |
| 2 day at −20° C.; thawed before baking | 2 | 0 |
| 2 day at −20° C.; not thawed before baking | 1 | 0 |
| 3 day at −20° C.; thawed before baking | 1.5 | 0 |
| 3 day at −20° C.; not thawed before baking | 0 | 0 |

Example 2

The viscosities of the glazing agents prepared under example 1 were measured at increasing shear rates. Flow measurements were carried out in a cone-plate CP50-2 (diameter 5 cm, angle 2°) Anton Paar viscometer. Shear rate is measured between 2-500 $s^{-1}$ at 20° C. From a shear rate of 100 $s^{-1}$ on, the viscosity profiles reached a plateau. At 100 $s^{-1}$, the solution subjected to 85° C. revealed a viscosity of 40 mPa·s, while the solution sterilised at 121° C. showed a viscosity of only 18 mPa·s.

CONCLUSION

Heat treatment above 100° C. of a vegetable protein solution gives a better and longer lasting gloss on (frozen) pastries as well as lower viscosities compared to a preparation at 85° C.

The invention claimed is:

1. A method to produce a glazing agent comprising the steps of:
    (a) dispersing a plant protein in water to obtain a plant protein solution of from 5 wt. % to 15 wt. % of the plant protein;
    (b) optionally homogenizing the plant protein solution; and
    (c) heating the plant protein solution at a temperature of from 100° C. to 155° C. for 0.1 seconds to 60 minutes, wherein the plant protein is selected from the group consisting of pulse, wheat gluten, and any combination thereof, and wherein the plant protein solution has a pH of at least 7.0 before heating.

2. The method according to claim 1, wherein the plant protein is a pulse protein, selected from the group consisting of chickpea, pea, lentil, wild bean, and lupin.

3. The method according to claim 1, wherein the plant protein solution comprises from 7 wt. % to 11 wt. % plant protein.

4. The method according to claim 1, wherein the plant protein solution is heated at a temperature of from 120° C. to 135° C.

5. The method according to claim 1, wherein the plant protein solution is heated for 30 seconds to 15 minutes.

6. A glazing agent comprising:
    a plant protein and water solution having 5 wt. % to 15 wt. % of plant protein, wherein the plant protein solution may be homogenous; and
    the plant protein solution is heated to a temperature from 100° C. to 155° C. for 0.1 seconds to 60 minutes, wherein the plant protein may include at least one of pulse, and wheat gluten, wherein the plant protein solution has a pH of at least 7.0 before heating.

7. The glazing agent according to claim 6, wherein the plant protein solution without any additives has a viscosity that is lower than 35 mPa·s at a shear rate of 100 $s^{-1}$ at room temperature, wherein the plant protein is selected from the group consisting of pulses, and wheat gluten, and wherein the pH of the plant protein solution is from 7.0 to 9.0.

8. The glazing agent according to claim 6, wherein the plant protein is a pulse protein, wherein the plant protein is selected from the group consisting of chickpea, pea, lentil, broad bean, wild bean, and lupin.

9. The glazing agent according to claim 6, further comprising a humectant.

10. The glazing agent according to claim 6, wherein the pH is from 7.5 to 8.5.

11. The glazing agent according to claim 6, further comprising a sugar.

12. The glazing agent according to claim 6, further comprising oil.

13. The glazing agent according to claim 6, wherein the plant protein solution further comprises 7 wt. % to 11 wt. % plant protein.

14. The glazing agent according to claim 6, further comprising rice protein in an amount from 0.001 wt. % to 1 wt. %.

15. The method according to claim 1, further comprising:
    applying the plant protein solution on baked or non-baked puff pastry, Danish pastry, croissants, viennoiserie, breads, bread rolls, buns, brioches, donuts, shortcrust, cookies, biscuits, bagels, pretzels, cakes, muffins, scones, tarts, pies, crumbles, strudels, cereals, and bars.

16. The method according to claim 15, wherein the applying further comprises:
    spraying, brushing, or rolling.

17. The method according to claim 15, wherein the plant protein solution is applied on food products that are frozen, defrosted, and/or on food products that are to be frozen after the plant protein solution is applied, and on bars.

18. The method according to claim 2, wherein the plant protein is pea protein.

19. The glazing agent according to claim 8, wherein the plant protein is pea protein.

20. The glazing agent according to claim 9, wherein the humectant is in an amount from 0.1 wt. % to 20 wt. %.

21. The glazing agent according to claim 11, wherein the sugar is in an amount from 0.1 wt. % to 20 wt. %.

22. The glazing agent according to claim 12, wherein the oil is in an amount of less than 4 wt. %.

23. The method according to claim 4, wherein the temperature is from 125° C. to 130° C.

24. The method according to claim 1, wherein the plant protein solution is heated for 1 minute to 3 minutes.

* * * * *